E. J. HARDY.
FLEXIBLE COUPLING.
APPLICATION FILED NOV. 17, 1914.
1,172,988.
Patented Feb. 22, 1916.
2 SHEETS—SHEET 1.
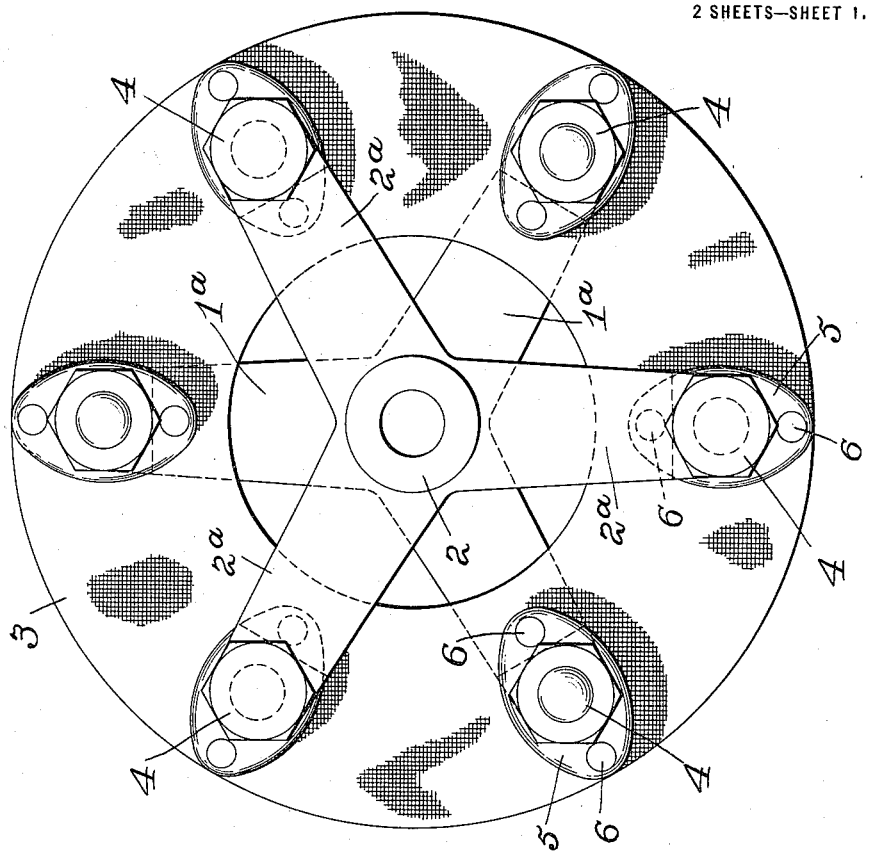
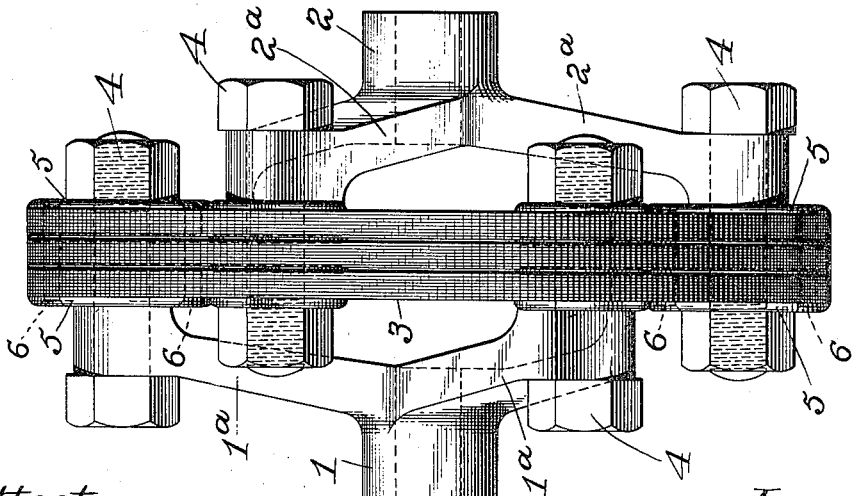
Attest:
Ewd L. Tolson
E. M. Hamilton
Inventor:
Edward John Hardy,
by Spear, Middleton, Donaldson & Spear
Attys.

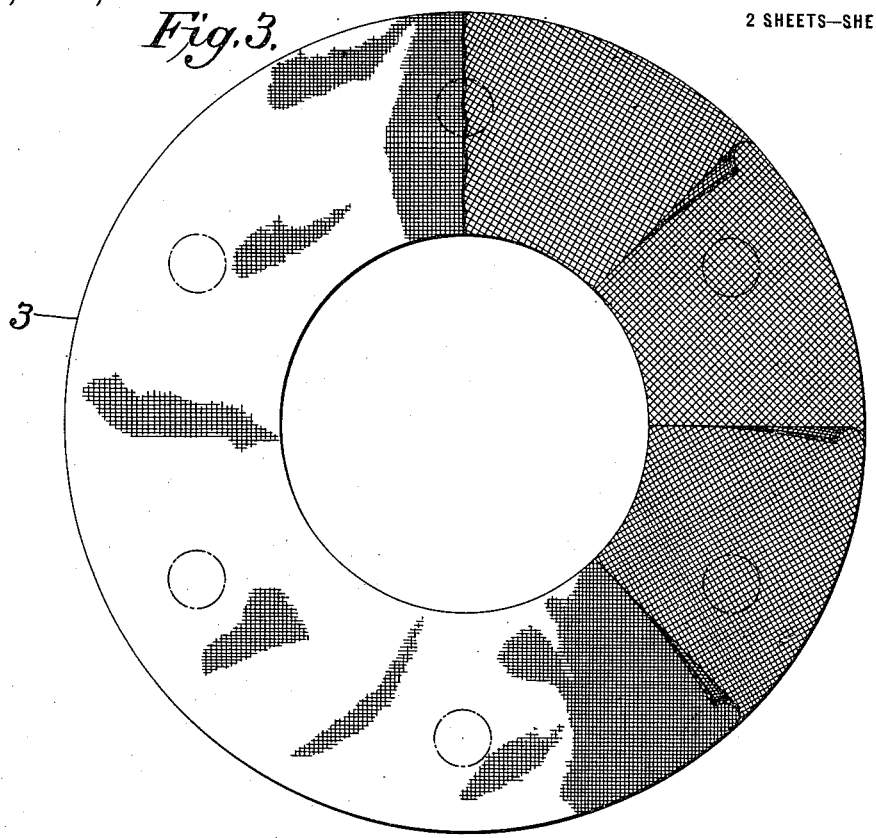
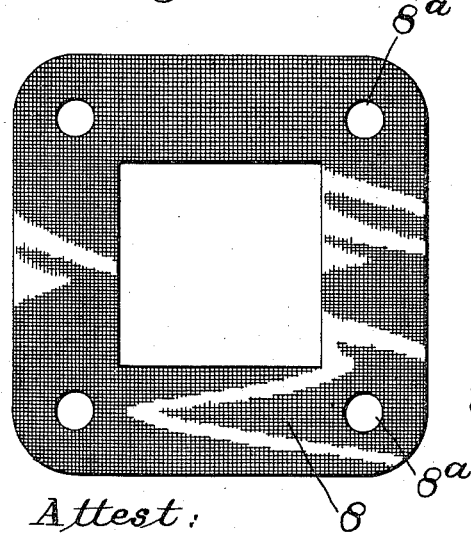
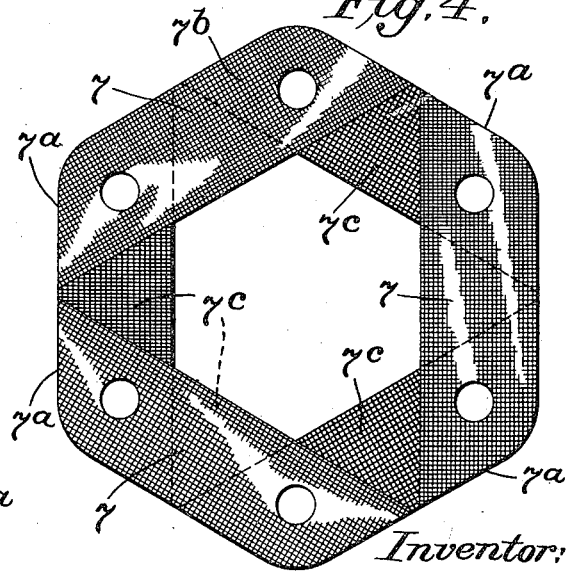

UNITED STATES PATENT OFFICE.

EDWARD JOHN HARDY, OF COVENTRY, ENGLAND.

FLEXIBLE COUPLING.

1,172,988.  Specification of Letters Patent.  Patented Feb. 22, 1916.

Application filed November 17, 1914. Serial No. 872,617.

*To all whom it may concern:*

Be it known that I, EDWARD J. HARDY, a subject of the King of Great Britain, residing at Coventry, England, have invented certain new and useful Improvements in Flexible Couplings, of which the following is a specification.

My present invention relates to improvements in flexible couplings for propeller shafts, and is designed more particularly for use in connection with motor vehicles, though adapted for use in connection with any driving and driven shafts which are to be connected with a limited amount of relative movement.

More particularly the invention relates to that type of flexible joint in which a flexible ring is attached to jaw elements carried by the respective shafts, and in which the jaw elements of one shaft alternate in position with those of the other shaft.

The object of the present invention is to provide an improved form of ring which may be easily and economically manufactured, may be built up to the exact thickness required by the circumstances under which it is to be used, and which will be calculated to resist the driving strains in the most effectual manner.

With these and other objects in view, the invention includes the novel features of construction and arrangement and combination of parts hereinafter described and particularly defined by the appended claims.

Several embodiments of my invention are illustrated in the accompanying drawings, in which—

Figure 1 is a side elevation of a flexible joint in which each shaft is provided with three jaw members; Fig. 2 is a view at right angles to Fig. 1; Fig. 3 is a face view of the disk or ring employed in the joint shown in Figs. 1 and 2; Figs. 4 and 5 are detail views of modifications.

Referring by reference characters to these drawings, the numerals 1 and 2 indicate the hubs of what I term the jaw members, which hubs are designed to be secured respectively to the ends of the driving and driven shafts, illustration of which is omitted for purpose of clearness. These hubs are shown in Figs. 1 and 2 as each provided with three radiating arms or jaw members $1^a$ and $2^a$, which are arranged alternately as shown.

3 designates the flexible rings which are flexibly connected to the jaw members by bolts 4. I may use any number of rings according to requirements, three being shown in Fig. 1 as a convenient example.

For additional strength at the points where the bolts pass through the disk I prefer to face the disk on each side by the washers 5, and these washers are preferably further secured in place by rivets 6 passing through the washers and through the ring 3. In order that this ring shall be of uniform strength throughout and thus provide equal tensile strength between all the points of connection of the jaw members, and also in order that it may be quickly and economically produced in any desired thickness, I construct the ring of a plurality of layers of rubberized fabric, which layers are superimposed so that their directions of greatest strength (for instance, the directions of the warp threads) are evenly spaced around the center of the disk or ring. The layers thus superimposed upon each other are secured together by vulcanization, which causes all the layers to firmly adhere to each other, and the complete ring is, by reason of the distribution of its component parts above described, equally strong in every direction, and at every part. These rings are usually manufactured in plain ring form, and supplied to the manufacturers of the joints without having the holes for the bolts formed therein. By reason of the uniform distribution of strength it will be apparent that it is immaterial where the bolt holes come, and the particular number of jaw elements which are used in the joint.

Instead of making up the disk in ring form, as shown in Figs. 1 to 3, I may make it up of straight independent strips 7 with the warp threads running lengthwise thereof, as shown, and with the edges of the strips bias cut, as indicated at $7^a$. For a joint having six jaw members such as shown in Figs. 1 and 2, six or any convenient number of such sets of strips 7 would be provided, these being built up of layers with their ends alternately overlapping, as indicated at $7^b$. Supposing each piece 7 to be composed, say, of seven layers of fabric, this would provide fourteen layers of fabric at the overlapping portion $7^b$, and in order to avoid the difference in thickness which would thus be caused between the overlapping portions and the intermediate portions, I provide filling pieces 7ᶜ between the overlapping portions so as to make the entire flexible member of uniform thickness.

In Fig. 5 I have shown a simple form of flexible disk or "ring" adapted for use in a flexible joint having four jaw members. In the average fabric the warp and weft are of substantially equal strength, and as in a four jaw element the pull between successive jaw members is at right angles, this makes the pull from each jaw member always lengthwise of one set of threads where the flexible connecting member is built up of superimposed layers of fabric with the warp or weft of each successive layer always running in the same direction, as shown in Fig. 5. In using a flexible element of this character, the bolt holes would be made at the corners 8ᵃ of the element 8. It will be understood that both the elements shown in Figs. 4 and 5, as well as that shown in the first three figures, are made up of layers of fabric and rubber vulcanized together, the number of layers depending on the thickness of flexible ring or element desired.

I claim as my invention:—

1. A flexible joint member comprising a plurality of separate layers of fabric secured together with the threads of one layer arranged at an angle to the threads of another layer or layers, said layers forming a single flat ring or disk-like member.

2. A flexible joint member comprising a plurality of separate layers of textile fabric secured together with the crossing threads of one layer arranged at an angle to the crossing threads of another layer or layers, said layers, in respect to the direction of their threads, being spaced substantially evenly about the axis of the member, said layers forming a single flat ring or disk-like member, substantially as described.

In testimony whereof, I affix my signature in presence of two witnesses.

EDWARD JOHN HARDY.

Witnesses:
 Ewd. L. Tolson,
 Bennett S. Jones.

Copies of this patent may be obtained for five cents each, by addressing the "Commissioner of Patents, Washington, D. C."